(12) United States Patent
Erdmann et al.

(10) Patent No.: US 12,404,903 B2
(45) Date of Patent: Sep. 2, 2025

(54) CLUTCH COMPRISING A DOUBLE-ACTING PISTON, AND AXIALLY ELASTIC END STOP DISC FOR A SLIDING SLEEVE

(71) Applicant: Schaeffler Technologies AG & Co. KG, Herzogenaurach (DE)

(72) Inventors: Knut Erdmann, Nuremberg (DE); Markus Kohler, Bad Windsheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/715,766

(22) PCT Filed: Nov. 16, 2022

(86) PCT No.: PCT/DE2022/100860
§ 371 (c)(1),
(2) Date: Jun. 3, 2024

(87) PCT Pub. No.: WO2023/110007
PCT Pub. Date: Jun. 22, 2023

(65) Prior Publication Data
US 2025/0035168 A1    Jan. 30, 2025

(30) Foreign Application Priority Data
Dec. 13, 2021    (DE) ............. 10 2021 132 821.7

(51) Int. Cl.
*F16D 25/06*    (2006.01)
*F16D 25/12*    (2006.01)
(52) U.S. Cl.
CPC ............. *F16D 25/12* (2013.01); *F16D 25/06* (2013.01)

(58) Field of Classification Search
CPC ...... F16D 25/06; F16D 25/061; F16D 25/062; F16D 25/063; F16D 25/0632; F16D 25/0635; F16D 25/0638; F16D 25/083; F16D 25/085; F16D 25/086; F16D 25/087
See application file for complete search history.

(56) References Cited

U.S. PATENT DOCUMENTS

| 2,428,336 | A | * | 9/1947 | Munschauer | F16D 25/061 |
| | | | | | 192/85.18 |
| 3,071,224 | A | | 1/1963 | Crankshaw | |
| 6,296,097 | B1 | * | 10/2001 | Hunt | B60K 23/08 |
| | | | | | 192/85.18 |
| 2007/0137967 | A1 | * | 6/2007 | Ishida | F16D 25/086 |
| | | | | | 192/30 R |

(Continued)

FOREIGN PATENT DOCUMENTS

| CN | 102359516 A | 2/2012 |
| DE | 102006033984 A1 | 1/2008 |

(Continued)

*Primary Examiner* — Stacey A Fluhart

(57) ABSTRACT

The invention relates to a clutch (1) for coupling and uncoupling an engine to and from a motor vehicle drive train, said clutch comprising a piston (2) which is positioned in a housing (3) so as to be axially displaceable between two pressure chambers (6, 7) as a result of pressure, the piston (2) being connected to an actuation bell (8) which is designed to contact/move a sliding sleeve (9), an end stop disc (22) being provided which is elastic in the axial direction in order limit the axial displaceability of the sliding sleeve (9).

18 Claims, 6 Drawing Sheets

(56) References Cited

U.S. PATENT DOCUMENTS

| | | | |
|---|---|---|---|
| 2021/0079969 A1* | 3/2021 | Jo | F16H 25/20 |
| 2021/0102515 A1* | 4/2021 | Susca | F02C 7/30 |
| 2024/0093735 A1* | 3/2024 | Ruider | F16D 11/14 |

FOREIGN PATENT DOCUMENTS

| | | | | |
|---|---|---|---|---|
| DE | 102013200397 A1 | | 7/2014 | |
| DE | 102014213884 A1 | | 2/2015 | |
| DE | 102021101141 A1 | | 7/2022 | |
| DE | 102021132819 B3 | | 11/2022 | |
| DE | 102021132822 B3 | | 11/2022 | |
| DE | 102021132824 B3 | | 12/2022 | |
| DE | 102021210982 A1 | * | 3/2023 | F16D 11/10 |
| JP | H04203626 A | | 7/1992 | |
| JP | 2007120684 A | | 5/2007 | |
| JP | 2009052584 A | | 3/2009 | |
| JP | 2017180782 A | | 10/2017 | |
| JP | 2021036173 A | | 3/2021 | |

\* cited by examiner

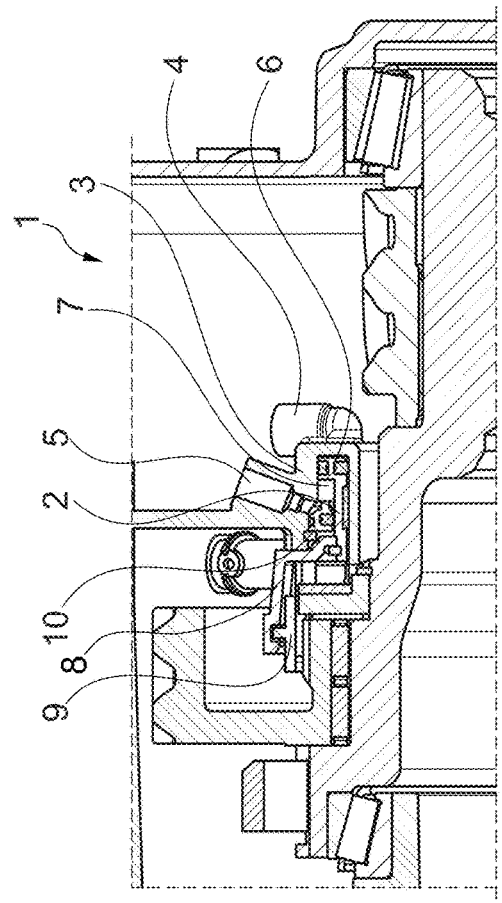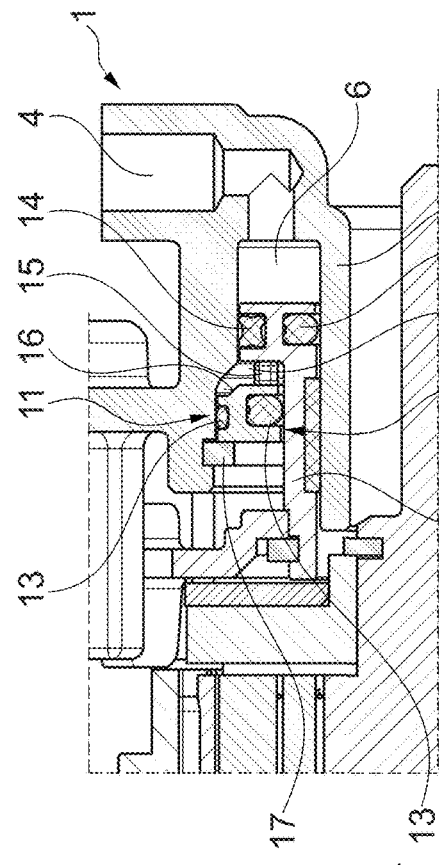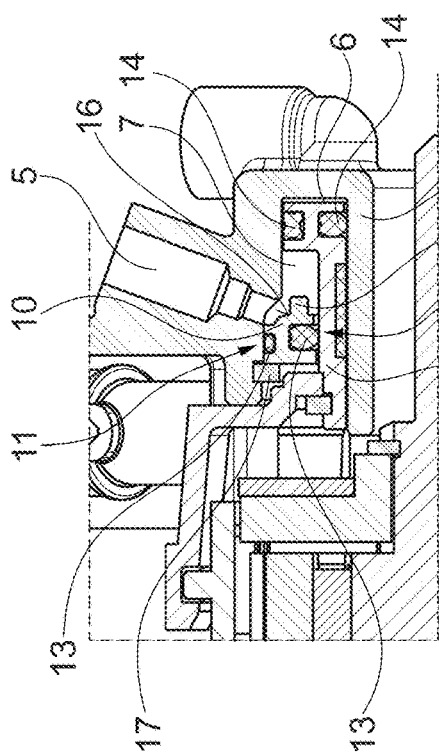

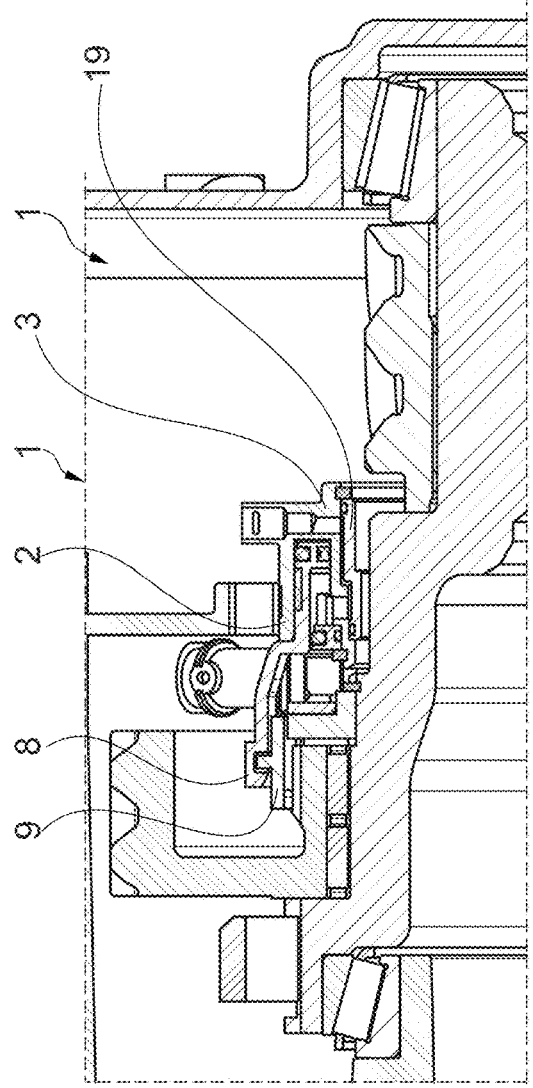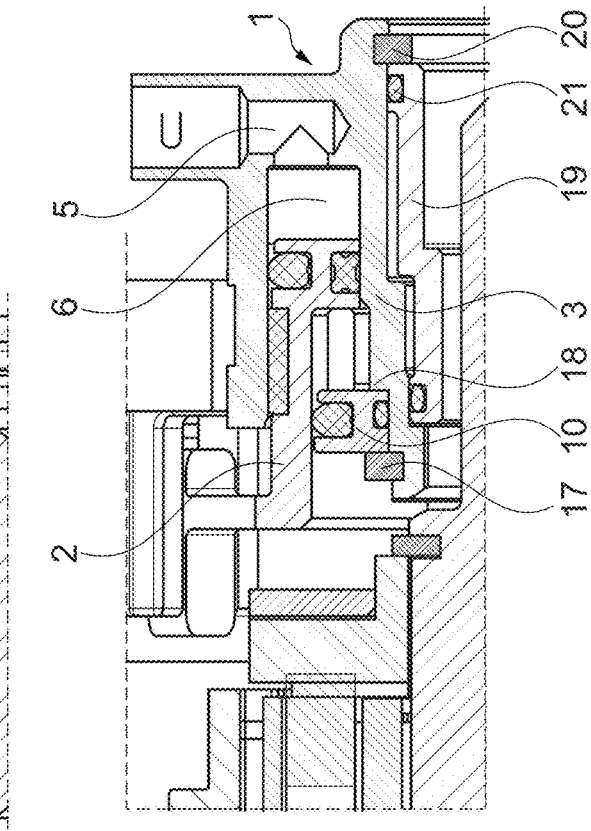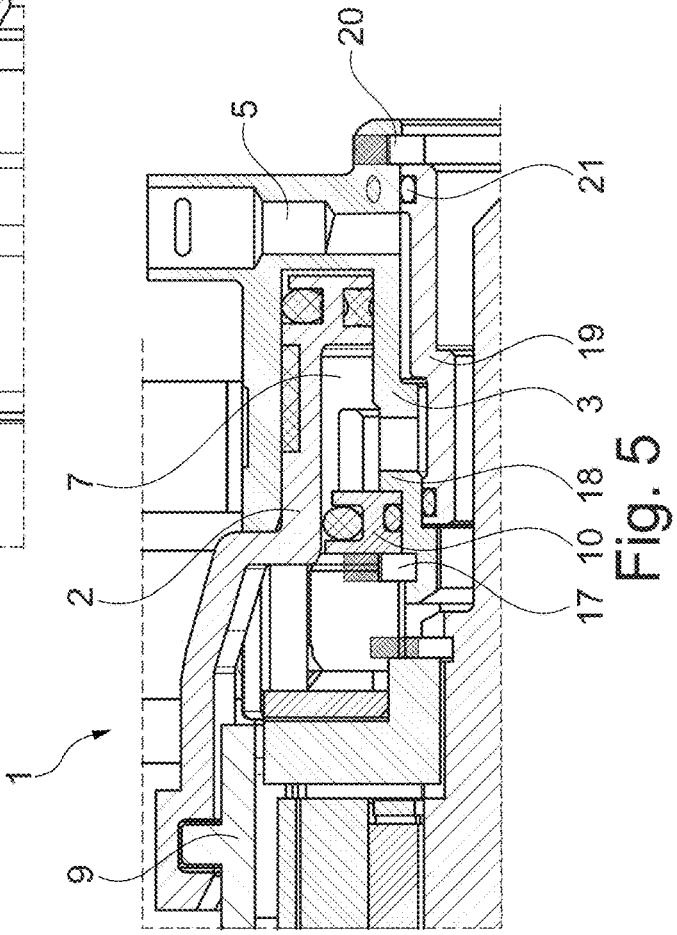

CLUTCH COMPRISING A DOUBLE-ACTING PISTON, AND AXIALLY ELASTIC END STOP DISC FOR A SLIDING SLEEVE

CROSS-REFERENCE TO RELATED APPLICATIONS

This application is the United States National Phase of PCT Appln. No. PCT/DE2022/100860 filed Nov. 16, 2022, which claims priority to German Application No. DE102021132821.7 filed Dec. 13, 2021, the entire disclosures of which are incorporated by reference herein.

TECHNICAL FIELD

The present disclosure relates to a clutch for coupling and uncoupling a motor to and from a motor vehicle drive train. The clutch has piston which is arranged in a housing, having, for example, pressure connections between two pressure chambers, each connected, for example, to one of the pressure connections so as to be axially displaceable due to pressure. The piston is connected in a materially bonded, form-fitting and/or force-fitting or integral manner to an actuating cap, for example separate or integrated, which is prepared for contacting/moving a sliding sleeve.

BACKGROUND

Decoupling devices for separating a motor from a drive train are already known from the prior art. For example, DE 10 2021 101 141 A1 discloses such a decoupling device, which can also be referred to as a clutch.

This older prior art relates to a decoupling device for separating a motor from a drive train, having a piston which is movably mounted in a housing parallel to a longitudinal axis L of the housing and which has an arm for the indirect or direct actuation of a clutch element. A first region of the piston is operatively connected to a first pressure space such that when pressure is applied to the first pressure space, the piston is displaced in a first direction parallel to the longitudinal axis L, and a second pressure space is provided which is operatively connected to a second region of the piston such that when pressure is applied to the second pressure space, the piston is displaced in a second direction parallel to the longitudinal axis L, which is opposite to the first direction. The disclosure also relates to such an object, which is to be considered as included here. In this earlier patent application, it has been particularly emphasized that the first region is located at a first longitudinal end of the piston and the second region is formed by a recess in a lateral surface of the piston and that the recess is formed on an outer half of the lateral surface of the piston, viewed radially with respect to the longitudinal axis L. It has also been found to be expedient for each of the pressure spaces to be equipped with one pressure connection each. In addition, the piston should be designed as an annular piston which extends about the longitudinal axis L.

Furthermore, the earlier patent application—which is to be considered to be incorporated herein with respect to the functional and operative contexts as well as the geometry—contains a first ball bearing which is located radially inside the piston and on which the arm of the piston is mounted. Thus, a claw should be provided, on which the first ball bearing rests radially on the inside and which is designed to actuate the clutch element with a free end. A second ball bearing can be included, on which the housing is supported radially on the outside.

Similar devices are also known from DE 10 2014 213 884 A1 and JP H04 203 626 A.

SUMMARY

The disclosure provides a generic clutch includes an end stop disc which is designed to be elastic in the axial direction in order to limit the axial displaceability of the sliding sleeve/shift sleeve.

Due to the hydraulic actuation, it is now easier to control the end stops of the shift piston. As a result, no unacceptable NVH noise is generated between the sliding sleeve and a clutch body. For this solution, an S-disc is used as an end stop between the locking ring and the clutch body. The S-disc can be designed to be elastic especially for the application and thus reduce the noise at the end stop. The S-disc can be mounted between the clutch body and the locking ring with the appropriate preload force. An improved disconnect unit with hydraulic actuation is now possible, especially for electric front axles and dual drive E-axles.

Although concepts with multiple disc clutches are known on the market, these are now being improved: Whereas until now the discs were constantly preloaded with shift pistons under force and the end stops in multiple disc clutches were the discs themselves, an improved variant is now possible. Due to the current requirement, the dog clutch is engaged with a form fit instead of a multiple disc clutch. However, end stop shifting noises are avoided. Due to the hydraulic actuation, the end stop points of the shift piston are still not easy to control, but unacceptable noises are avoided. Hard end stops between the clutch body and the sliding sleeve are avoided. Currently known end stops, which rely on a form fit, for example by using "humps" on the clutch body or rely on a form fit, for example by means of three end stops on the sliding sleeve itself, are now unnecessary. For the solution according to the disclosure, an S-disc is used as an end stop between the locking ring and the clutch body. The S-disc can be designed to be elastic, especially for the application, which reduces the noise at the end stop. The S-disc can be mounted between the clutch body and the locking rings with the appropriate preload force.

The disclosure also provides a system that works for double-acting pistons/pistons acting in an alternating manner. The new concept focuses on developing two variable pressure spaces within one housing using a baffle plate and a variable pressure connection using a pressure space sleeve. In order to return to the disengaged state when the claw clutches are engaged, a baffle plate is arranged behind a second seal and the design of the pressure space is changed. In a first variant, a housing design is provided which contains a piston that can be actuated in two directions. The piston is inserted into the housing with two seals in the same way as a standard hydraulic clutch slave cylinder. Here, the first pressure chamber and the pressure connection are located next to, for example to the right of, the ring piston and provide a forward stroke. A second pressure chamber is then located to the left of a tapered section of the ring piston, for example. This second pressure chamber is made possible by inserting a baffle plate with a third seal into the housing and securing it with a circlip. It has a second pressure connection that moves the piston back to the left when pressure is applied, thus providing the return stroke. In some embodiments, however, the piston may be designed in two parts for assembly.

In some variants, the second pressure chamber is relocated inwards, to the underside of the piston. In this case, a pressure space sleeve is used to accommodate a pressure connection in a constricted installation space on the inside of the housing. This is equipped with an annular groove and two lateral O-rings and is fixed in the housing with a circlip. In this regard, two holes within the annular groove ensure the flow of the operating medium.

It shall generally be noted that the piston should be guided and centered via a sliding belt. The baffle plate is sealed with respect to the housing using an O-ring. The end stop is implemented via additional webs on the baffle plate when the claw is disengaged. A sensor path measurement is provided in both variants. An X sealing ring can be used as pressure is applied to it (in an alternating manner) from both sides (pressure chambers 1 and 2).

The disclosed device is suitable for a front wheel E-axle and a hydraulic actuation of the clutch/decoupling unit, e.g., when using a claw clutch.

Ultimately, a DCU/disconnect unit for E-axles with hydraulic actuation, having locking elements, is at the center of this disclosure. The disclosed device now achieves an improvement. The residual, unwanted pressures in the shift piston (connection P1 or P2) from the hydraulic system cause an unusual movement of the shift piston in the pressure chambers P1 and P2 due to the form-fitting connection between the shift piston and the sliding sleeve, in addition to the movement of the sliding sleeve. Such unintentional movements are critical in terms of both function and functional safety (e.g., breakage of the toothing, uncontrolled driving of the vehicle). In the hydraulic system, it can be implemented with additional effort or in the pressure valves an implementation is possible with additional valves in a complex manner. This is no longer necessary now. At the same time, due to the complex hydraulic valves, the controllability and positioning of the shift piston was also not robust in the past. An improvement is also achieved in this regard.

The use of locking elements in/with moving parts leads to improvements in DCUs. A locking element between the shift cylinder and the shift piston as the one locking element, for example as a slotted wire ring, formed wire ring or as a pressure piece with a spiral spring, is expedient. At the same time, it is also useful to use a locking element between the sliding sleeve and the idler gear. The task of both locking elements is to avoid the unusual axial movement of the shift piston, which is successful. The axial force is distributed to both locking elements and the end positions of the sliding sleeve and the shift piston are ensured at the same time. In order to minimize friction, axial play between the sliding sleeve and shift piston is ensured.

An improved disconnect unit with hydraulic actuation is now introduced, especially for front axles and dual drive E-axles. Due to the current findings and the new concepts utilizing a form fit (not a frictional engagement), solutions of this type are still unknown.

The present disclosure thus relates to a DCU/disconnect unit for E-axles, having a shift crown with two functions. Concepts with multiple disc clutches are known on the market. Until now, the discs were constantly preloaded with shift pistons under force. The soft end stop of the multiple disc clutch was the disc itself. Due to the current requirement, the torque clutch is engaged with a form fit instead of a multiple disc clutch. This results in shifting noises when meshing (tooth-on-tooth position), which can now be avoided. Due to the hydraulic actuation, the tooth-on-tooth position of the shift piston/shift crown cannot simply be controlled with the appropriate speed and force. This is still the case now, but the previously unacceptable NVH noise is avoided. In other cases, such noise would usually occur between the sliding sleeve/shift sleeve and the clutch body. Currently known solutions were based on synchronization and the use of a shift fork with corresponding stiffness. However, the assembly of the shift crown/shift piston with the sliding sleeve also had to be considered in this case. This is now all avoided and the axial stiffness is preset. The assembly is thus simplified. The hard end stop in the tooth-on-tooth position between the clutch body and the sliding sleeve is reduced. A robust assembly is achieved with the help of the snap connection to the sliding sleeve. The solution utilizes the special design of the shift crown, which simultaneously takes into account the assembly and axial stiffness. The shift crown has a special arm design for assembly and stiffness. With the lever for radial stiffness, it is possible to implement the snap connection at the groove in the shift crown/shift piston to the web on the sliding sleeve. The lever for the axial stiffness also makes it possible to adjust the axial stiffness well.

The end stop disc may have an S-shape or double S-shape in a longitudinal section along the axis of rotation of the clutch.

The end stop disc may be mounted in a preloaded manner.

It is further expedient if the end stop disc is mounted on a shaft, for example an intermediate shaft.

In an example embodiment, the end stop disc is mounted with a preload force between a clutch body prepared for torque connection with the sliding sleeve and a locking ring fixed to the shaft.

The radial extent of the end stop disc may be greater than that of the clutch body.

An empty space may be enclosed between the end stop disc and the clutch body.

The locking ring may be arranged in an axially positionally fixed manner in a groove on the lateral surface of the shaft.

In an example embodiment, the end stop disc is designed to be at least ten times (at most 100 times) more elastic in the axial direction than the locking ring and/or the clutch body.

Furthermore, a stop disc/baffle plate may be arranged in a pressure chamber, e.g., separate from the housing and the piston, which limits the axial displaceability of the piston at least in an axial direction. In this way, variable pressure spaces/pressure chambers and pressure connections for pistons acting in an alternating manner are implemented. The present disclosure further focuses on two variants for implementing variable pressure chambers for pistons acting in an alternating manner.

It is expedient if the stop disc is arranged radially inside or radially outside of the piston. The radially inner arrangement, for example, has advantages, as the piston may be formed integrally with the actuating cap. A better use of installation space, for example smaller use of installation space, can possibly be achieved with an arrangement radially on the outside. However, this could have disadvantages during assembly.

If the piston is prepared for double-acting/alternating pressure application, actuation in one axial direction and the opposite axial direction is possible in a small installation space.

It has also proven expedient for the stop disc to have at least one axial projection designed to strike the axial piston and penetrate one of the pressure chambers. The result is a targeted design and use of installation space.

If a plurality of axial projections protrude from one end face of the stop disc, distributed around the circumference, jamming of the piston/annular piston within the housing can be effectively prevented. For example, an evenly distributed arrangement of the axial projections may be advantageous in this regard.

In an example embodiment, a circlip fixed in the housing determines at least the axial position of the stop disc, for example together with a step of the housing.

The sliding sleeve may be connected to the actuating cap. This can also simplify the assembly. This connection can be permanent or temporary.

At least one mechanical locking element may be formed and arranged between an axially movable component and an axially fixed component in such a way that the sliding sleeve is or can be locked in two different axial positions, depending on the operating state.

The locking element may be arranged in the (axially) movable component, namely the shift sleeve or the piston on the one hand, and the axially fixed component, namely an idler gear or the housing on the other.

It is expedient if the locking element is arranged in a spring-loaded manner in a seat in the axially fixed (or axially movable) component in order to selectively engage in a locking manner between two grooves in the axially movable (or axially fixed) component.

In this regard, the grooves may form a recess that is beveled on both sides.

It is expedient if a locking/stopping action is forced when the locking element engages in one of the two grooves.

In order to distribute the forces, it has proven useful to utilize a plurality of locking elements.

It is desirable if at least one of the locking elements/the locking element is formed as a ball or is spherical.

In an example embodiment, two detents are provided, each with a locking element, at the same radial distance from an axis of rotation of the clutch.

In this regard, it is expedient if the grooves are provided in a hardened insert.

It is desirable that the actuating cap has a section that is designed as a cantilever and has a snap closure at one free end for engaging with the sliding sleeve.

The cantilever projecting from a main body of the actuating cap may be spaced apart via a slot/recess extending between the cantilever and the main body, by means of which the elasticity/stiffness in the axial direction and radial direction may be adjusted in a targeted manner. The cantilever is therefore (mostly but not completely) separated from the main body via the slot. The elasticity/stiffness in both the axial and radial directions is adjusted in a targeted manner via the extension.

The slot may only partially extend through the material of the actuating cap in the circumferential direction, but completely in the radial direction.

It is also beneficial if an elongated hole is provided in the cantilever. A precise adjustment of the stiffness/elasticity can then be made.

If the elongated hole runs parallel to the slot and preferably has the same axial width, production is simplified.

The cantilever may define a lever. The pre-adjustment is thereby simplified.

If the snap closure surrounds a radial projection of the sliding sleeve with axial play, the assembly is simplified.

It is expedient if the elongated hole is designed as a rectangular through-hole.

In an example embodiment, the cantilever is designed in an L- or Z-shape.

BRIEF DESCRIPTION OF THE DRAWINGS

The present disclosure is explained in more detail below with the aid of a drawing. In the figures:

FIG. 1 shows a partially illustrated longitudinal section through a clutch according to the disclosure, wherein the two pressure spaces are provided radially outside of the piston, FIG. 2 shows the operating position of the clutch from FIG. 1 for "claw engaged", FIG. 3 shows the operating position "claw disengaged" of the clutch of FIGS. 1 and 2, FIG. 4 shows a clutch according to the disclosure, wherein the pressure chambers are provided radially inside of the piston, FIGS. 5 and 6 show the operating positions "claw engaged" (FIG. 5) and "claw disengaged" (FIG. 6) of the clutch of FIG. 4.

DETAILED DESCRIPTION

Figure 7:
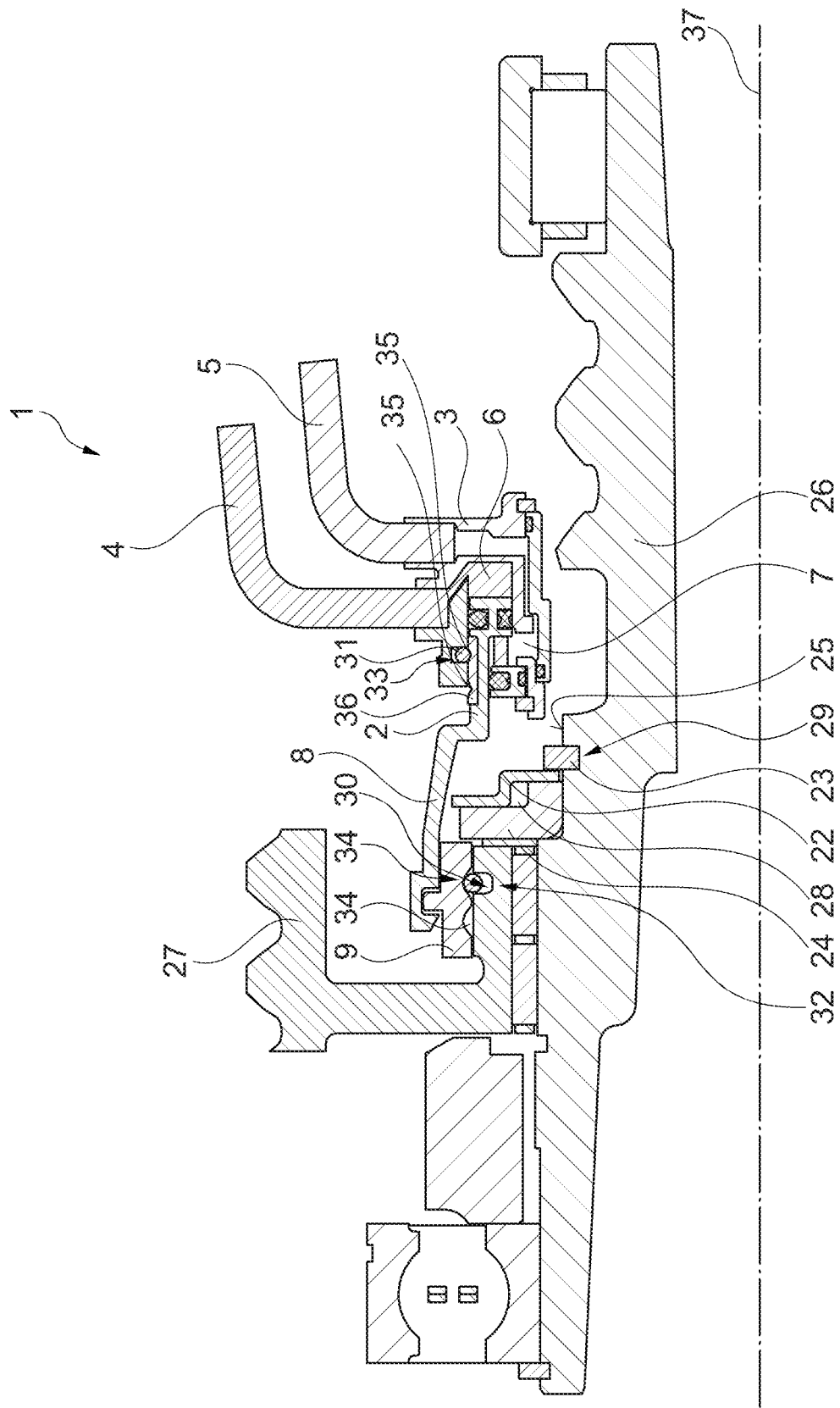
FIG. 7 shows a detail of a longitudinal section through a further clutch according to the disclosure in a first operating position, wherein an intermediate shaft with an end stop disc mounted thereon is used as a special feature.

The figures are only schematic in nature and serve only for understanding of the disclosure. Identical elements are provided with the same reference signs. The features of the individual embodiments can be interchanged.

FIG. 1 shows a clutch 1. It has a piston 2. The piston 2 is designed for a double-acting/alternating pressure application. It is arranged in a housing 3. Pressure connections 4 and 5 lead to a first pressure chamber 6 and a second pressure chamber 7 respectively. In this regard, reference is also made to FIGS. 2 and 3. The pressure connection 4 leads into the first pressure chamber 6. The pressure connection 5 leads into the second pressure chamber 7. Naturally, the solution can also be implemented vice versa.

An actuating cap 8 is also mounted on the piston 2. In the clutch 1 of FIGS. 1 to 3, the piston 2 and the actuating cap 8 are two separate components that are attached to one another. In the clutch 1 of FIGS. 4 to 6, the piston 2 and the actuating cap 8 form an integrated, single-material and component made in one piece.

The actuating cap 8 engages a sliding sleeve 9. In the clutches 1 of FIGS. 1 to 6, a stop disc/baffle plate 10 is also provided. The stop disc 10 has a first seat 11 radially on the outside and a second seat 12 radially on the inside.

As can be seen in FIGS. 2 and 3, a seal 13 is provided in each of the two seats 11 and 12. These seals 13 seal the pressure chamber 7, i.e., the second pressure chamber. Two further seals 14 seal the first pressure chamber 6. The stop disc 10 has an axial projection 15. In its "claw disengaged" operating position, the axial projection 15 protrudes completely through the second pressure chamber 7 and rests against the piston 2, as shown in FIG. 3. Here, the axial projection 15 protrudes from an end face 16 of the stop disc 10.

There is a circlip 17 and a step 18 by means of which the stop disc 10 is indirectly or directly fixed about its axial position. This can be seen particularly well in FIGS. 5 and 6.

Returning to FIG. 4, attention should be drawn to a pressure space sleeve 19. This pressure space sleeve 19 is required to connect the pressure connection 5 to the second pressure chamber 7.

In this regard, the pressure space sleeve 19 is fixed in position via a pressure space sleeve circlip 20 with the interposition of a seal in the form of an O-ring 21.

FIG. 7 shows a clutch 1 with an end stop disc 22. This end stop disc 22 is arranged axially between a locking ring 23 and a clutch body 24. These last two components are located on a lateral surface 25 of an (intermediate) shaft 26. There is also an idler gear 27. The end stop disc 22 has an S-shape and is elastic in the axial direction. It is made of sheet metal. An empty space 28 is enclosed between the end stop disc 22 and the clutch body 24. The locking ring 23 sits in a groove 29 in the lateral surface 25.

A plurality of locking elements is provided, namely the locking element 30 and the locking element 31. Both the locking element 30 and the locking element 31 are designed as balls. The locking element 30 sits in a locking element receiving groove/groove 32, whereas the locking element 31 sits in a locking element receiving groove/groove 33 in the housing 3. The locking element 30 is intended for locking insertion into grooves 34, whereas the locking element 31 is intended to engage in the same grooves 35 in an insert 36, which is anchored in the piston 2. These grooves 34 and 35 have a beveled surface. The axis of rotation is provided with the reference sign 37.

Bearings are also provided on the (intermediate) shaft 26.

Figure 8:
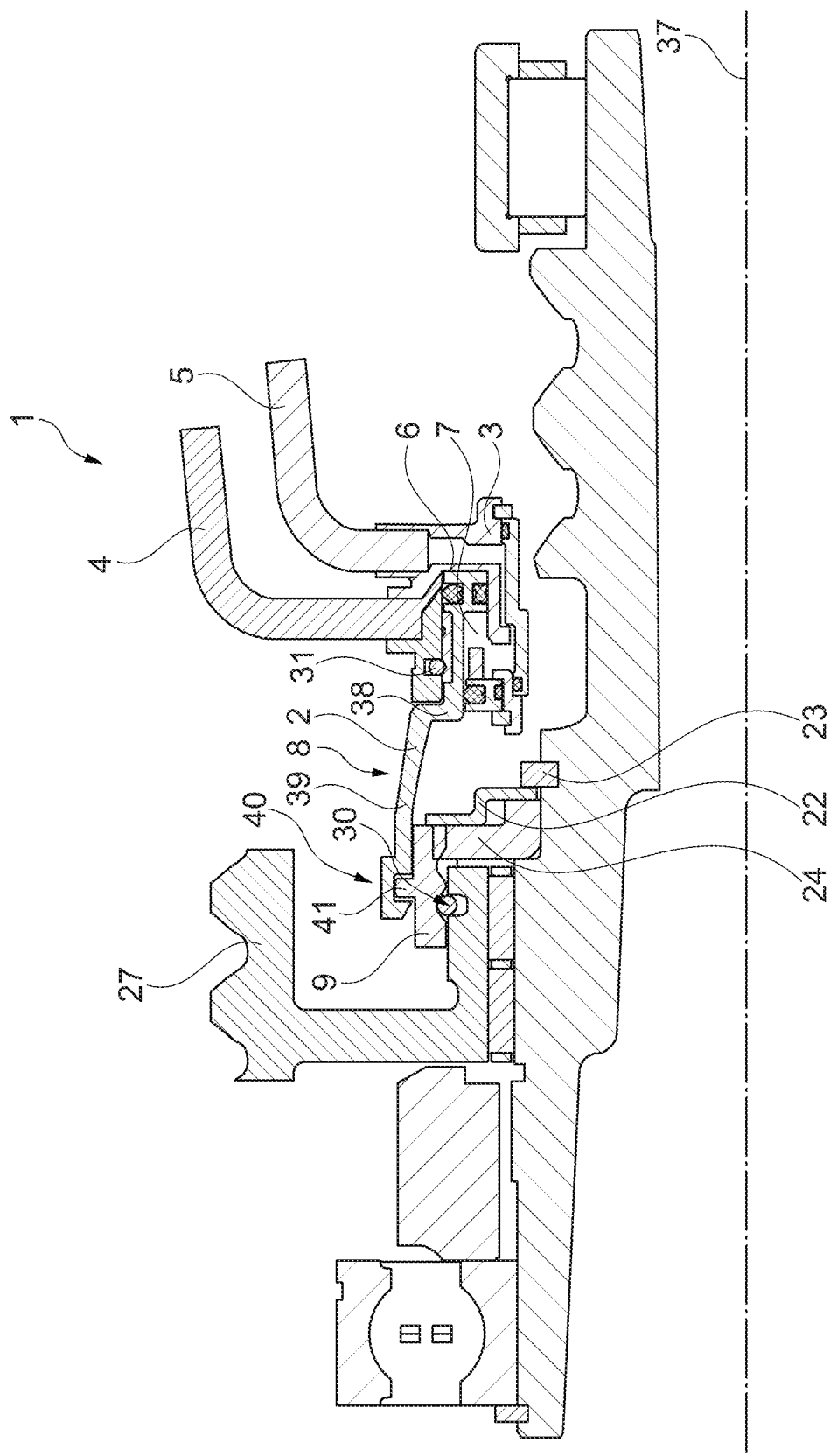
FIG. 8 shows a part of a longitudinal section through the further clutch according to the disclosure in a second operating position, in which the shift sleeve and the actuating cap are in an axially displaced position relative to FIG. 7, and FIGS. 9 and 10 show the shift position details of the actuating cap, wherein a snap closure is shown enlarged in a longitudinal section in FIG. 9 and a cantilever is shown enlarged in a perspective view in FIG. 10.

While one position of the clutch is assumed in FIG. 7, the other shift position of the clutch 1 is assumed in FIG. 8.

Figure 9:
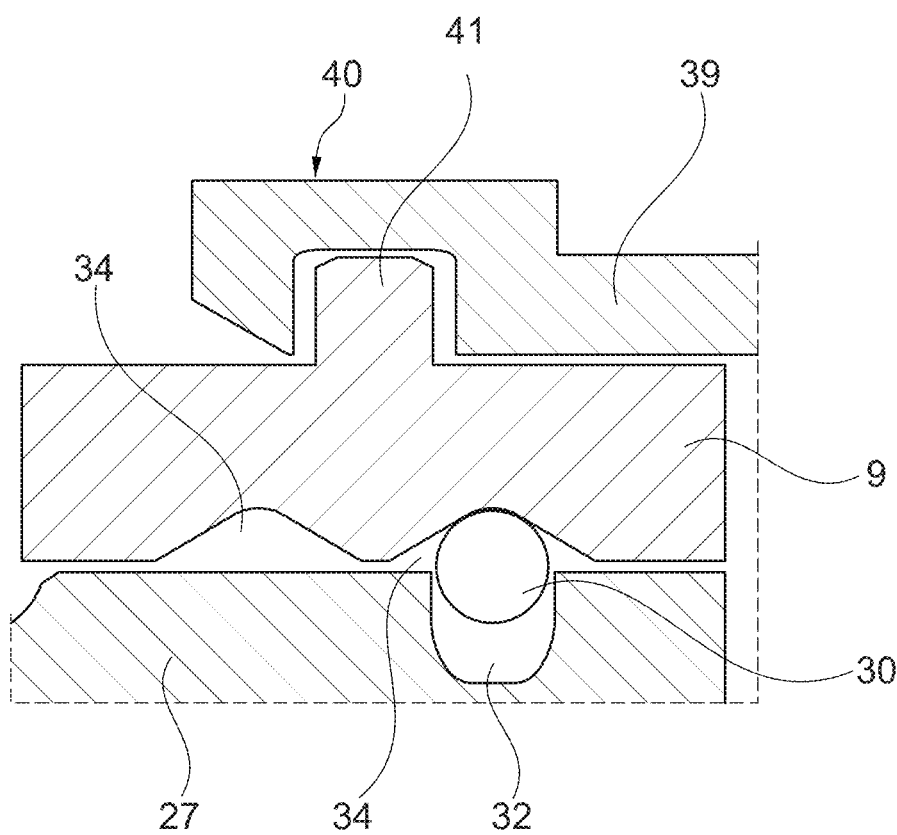

In this regard, attention should also be drawn once again to the design of the actuating cap 8 with a main body 38, which transitions into a cantilever 39, which forms a snap closure 40 at its free end, which surrounds a radial projection 41 of the sliding sleeve/shift sleeve with axial play. Reference is also made to FIG. 9 in this regard.

Figure 10:
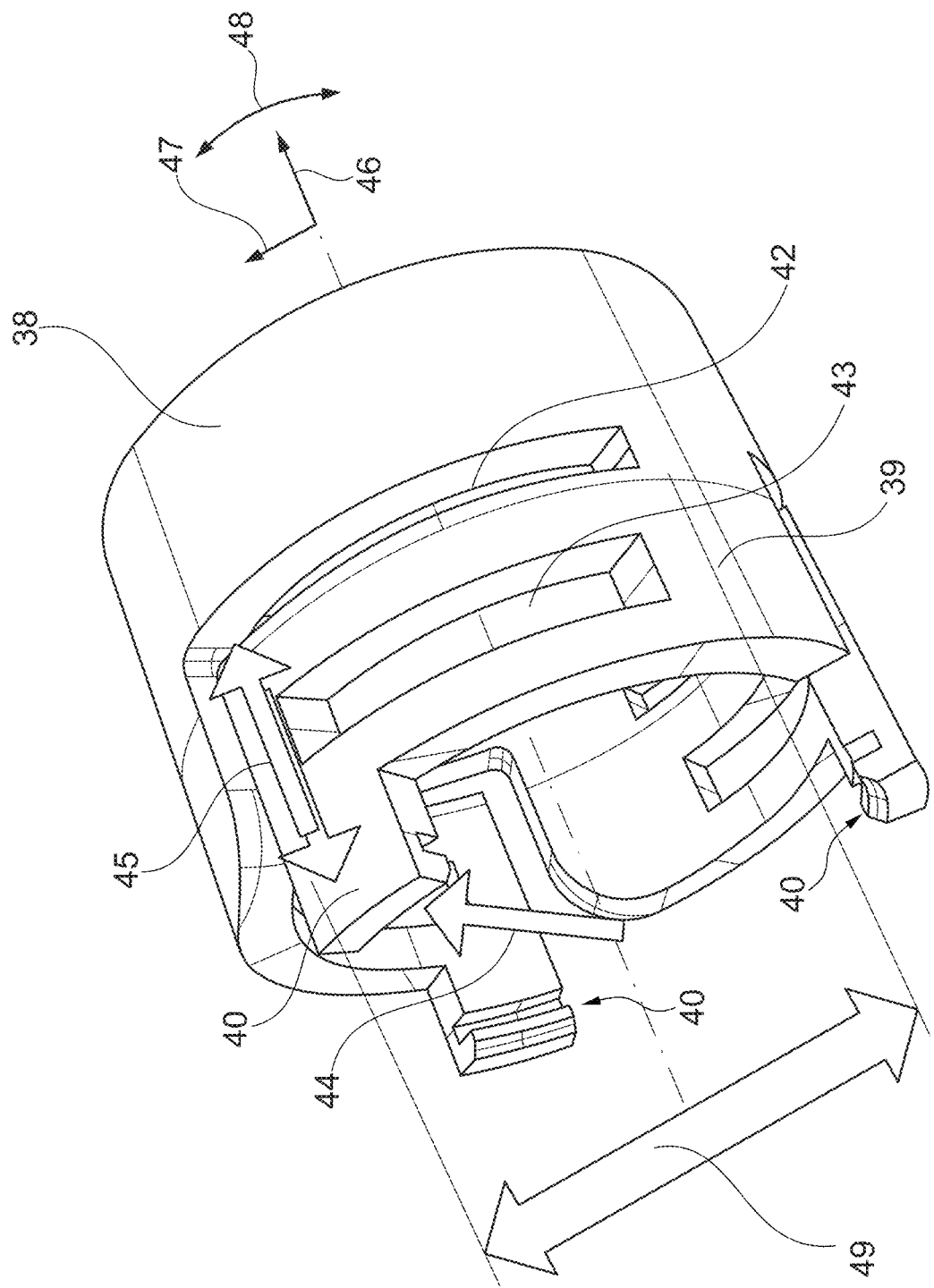

As also indicated in FIG. 10, the end of the cantilever 39 akin to a snap closure is designed in the manner of a clip or gripper. One the one hand, a slot 42 is provided and, on the other hand, an elongated hole 43 is provided in order to adjust the elasticities/stiffnesses shown with the arrows 44 and 45 in a targeted manner.

As in FIG. 1, the axial direction is marked with the reference sign 46 and the radial direction with the reference sign 47 in FIG. 10. In FIG. 10, the circumferential direction is indicated by the reference sign 48.

The cantilever 39 thus constitutes a lever 49.

REFERENCE NUMERALS

1 Clutch
2 Piston/shift piston
3 Housing/(shift) cylinder
4 Pressure connection
5 Pressure connection
6 First pressure chamber
7 Second pressure chamber
8 Actuating cap
9 Sliding sleeve/shift sleeve
10 Stop disc/baffle plate
11 First seat
12 Second seat
13 Seal
14 Seal
15 Axial projection
16 End face
17 Circlip
18 Step
19 Pressure space sleeve
20 Pressure space sleeve circlip
21 O-ring
22 End stop disc
23 Locking ring
24 Clutch body
25 Lateral surface
26 (Intermediate) shaft
27 Idler gear
28 Empty space
29 Groove
30 Locking element
31 Locking element
32 Locking element receiving groove/groove
33 Locking element receiving groove/groove
34 Channel/groove
35 Channel/groove
36 Insert
37 Axis of rotation
38 Main body
39 Cantilever
40 Snap closure
41 Radial projection
42 Slot/recess
43 Elongated hole
44 Elasticity/stiffness
45 Elasticity/stiffness
46 Axial direction
47 Radial direction
48 Circumferential direction
49 Lever

The invention claimed is:

1. A clutch for coupling and uncoupling a motor to and from a motor vehicle drive train, having a piston which is arranged in a housing between two pressure chambers so as to be axially displaceable due to pressure, wherein the piston is connected to an actuating cap which is arranged for contacting or moving a sliding sleeve, wherein an end stop disc which is designed to be elastic in the axial direction is provided in order to limit the axial displaceability of the sliding sleeve, and wherein the end stop disc has an S-shape or double S-shape in a longitudinal section along the axis of rotation of the clutch.

2. The clutch according to claim 1, wherein the end stop disc is mounted in a preloaded manner.

3. The clutch according to claim 1, wherein the end stop disc is mounted on a shaft.

4. The clutch according to claim 1, wherein the end stop disc is mounted with a preload force between a clutch body arranged for torque connection with the sliding sleeve and a locking ring fixed to a shaft.

5. The clutch according to claim 4, wherein the radial extent of the end stop disc is greater than that of the clutch body.

6. The clutch according to claim 4, wherein an empty space is enclosed between the end stop disc and the clutch body.

7. The clutch according to claim 4, wherein the locking ring is arranged in an axially positionally fixed manner in a groove on the lateral surface of the shaft.

8. The clutch according to claim 4, wherein the end stop disc is designed to be at least ten times more elastic in the axial direction than the locking ring or the clutch body.

9. The clutch according to claim 1, wherein the sliding sleeve is connected to the actuating cap.

10. A clutch for selectively coupling a motor and a motor vehicle drive train, comprising:
   an axis of rotation;
   a housing comprising two pressure chambers;
   a sliding sleeve;
   an actuating cap arranged for moving the sliding sleeve;
   a piston:
      arranged in the housing between the two pressure chambers;
      axially displaceable due to pressure; and
      connected to the actuating cap; and
   an end stop disc, axially elastic and arranged to limit axial displacement of the sliding sleeve, wherein the end stop disc comprises an S-shape or a double s-shape in a longitudinal section taken along the axis of rotation.

11. The clutch of claim 10 wherein the end stop disc is installed preloaded.

12. The clutch of claim 10, further comprising a shaft, wherein the end stop disc is mounted on the shaft.

13. The clutch of claim 12 further comprising:
   a clutch body arranged for torque connection with the sliding sleeve; and
   a locking ring fixed to the shaft, wherein the end stop disc is installed with a preload force between the clutch body and the locking ring.

14. The clutch of claim 13, wherein a radial extent of the end stop disc is greater than a radial extent of the clutch body.

15. The clutch of claim 13 further comprising an empty space enclosed between the end stop disc and the clutch body.

16. The clutch of claim 13, wherein:
   the shaft comprises a lateral surface with a groove; and
   the locking ring is arranged in the groove.

17. The clutch of claim 13, wherein the end stop disc is at least ten times more elastic in an axial direction than the locking ring or the clutch body.

18. The clutch of claim 10, wherein the sliding sleeve is connected to the actuating cap.

* * * * *